United States Patent [19]

Tanguy et al.

[11] 4,389,326

[45] Jun. 21, 1983

[54] METHOD OF STORING HYDROGEN IN INTIMATE MIXTURES OF HYDRIDES OF MAGNESIUM AND OTHER METALS OR ALLOYS

[75] Inventors: Bernard Tanguy, Pessec; Jean-Louis Soubeyroux, Voreppe; Michel Pezat, La Brede; Josik Portier, Pessac; Paul Hagenmuller, Talence, all of France

[73] Assignee: Agence Nationale de Valorization de la Recherche, France

[21] Appl. No.: 272,943

[22] Filed: Jun. 12, 1981

Related U.S. Application Data

[63] Continuation-in-part of Ser. No. 70,175, Aug. 27, 1979, abandoned, which is a continuation-in-part of Ser. No. 770,355, Feb. 22, 1977, abandoned.

[51] Int. Cl.³ .......................... C01B 6/00; C01B 6/04
[52] U.S. Cl. .................... 252/188.26; 423/645; 423/647; 423/644; 252/188.25
[58] Field of Search .................. 423/644, 645, 647; 75/168 J; 252/181.6, 181.7, 188, 188.3 R, 188.25, 188.26

[56] References Cited

U.S. PATENT DOCUMENTS

| | | | |
|---|---|---|---|
| 2,121,292 | 6/1938 | Haughton et al. | 75/168 J |
| 3,315,479 | 4/1967 | Wiswall et al. | 62/48 |
| 3,375,676 | 4/1968 | Reilly et al. | 62/48 |
| 3,479,165 | 11/1969 | Lyon | 423/647 |
| 3,485,585 | 12/1969 | Snyder | 423/647 |
| 3,801,311 | 4/1974 | Church et al. | 75/168 J |
| 4,040,410 | 8/1977 | Libowitz | 423/644 |
| 4,107,405 | 8/1978 | Pencheron et al. | 423/644 |
| 4,126,242 | 11/1978 | Yajima et al. | 75/168 J |
| 4,161,402 | 7/1979 | Sandrock | 423/644 |
| 4,200,623 | 4/1980 | Muller et al. | 423/644 |
| 4,200,624 | 4/1980 | Muller et al. | 423/644 |
| 4,214,699 | 7/1980 | Buchner | 423/648 R |

FOREIGN PATENT DOCUMENTS

| | | | |
|---|---|---|---|
| 777095 | 6/1957 | United Kingdom | 423/647 |
| 777096 | 6/1957 | United Kingdom | 423/647 |

*Primary Examiner*—Herbert T. Carter
*Attorney, Agent, or Firm*—Omri M. Behr

[57] ABSTRACT

There is provided an efficient method of storing hydrogen in materials of small mass and small volume. The products of the present invention comprise intimate mixtures (as opposed to alloys) of magnesium and other metals or alloys capable of forming hydrides. The hydrides are selected so that the hydrides have a substantially lower thermal stability than that of magnesium hydride.

3 Claims, 7 Drawing Figures

Hydruration at 345°C under 30 bars of Mg alone and of various mixtures Mg-metal or alloy -

Hydruration at 345°C under 30 bars of Mg alone and of various mixtures Mg-metal or alloy -

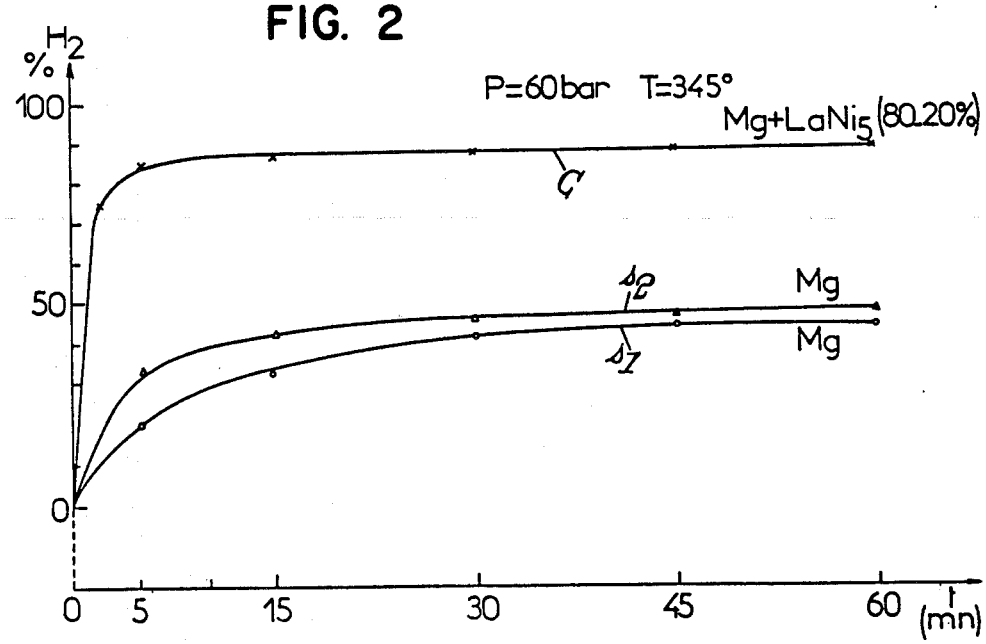
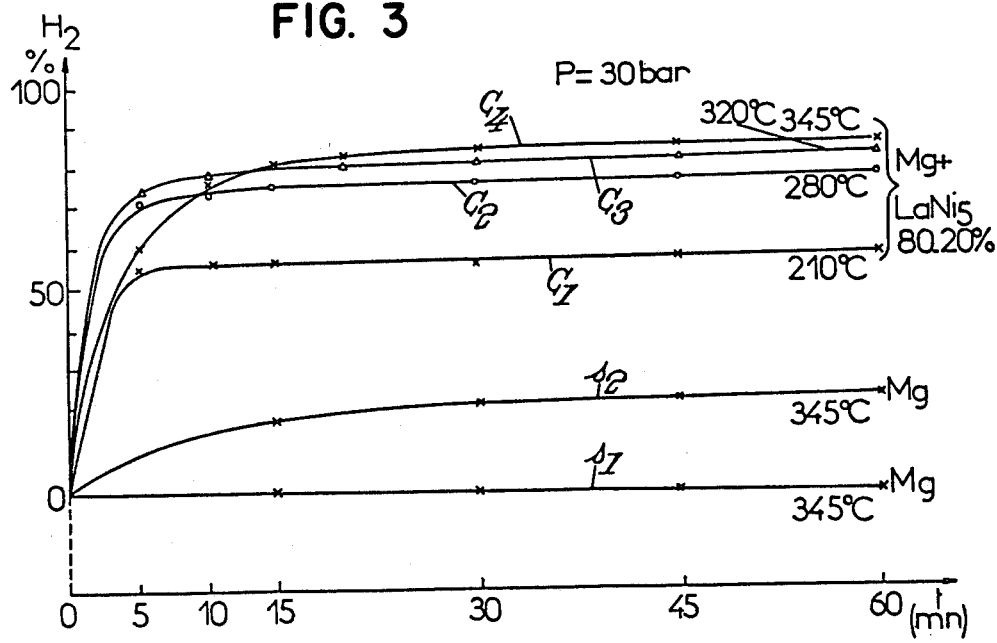

Decomposition at different temperatures, under 2 bars of the hydride obtained from a mixture of Mg-LaNi$_5$

METHOD OF STORING HYDROGEN IN INTIMATE MIXTURES OF HYDRIDES OF MAGNESIUM AND OTHER METALS OR ALLOYS

RELATED APPLICATIONS

This application is a Continuation in Part of copending application Ser. No. 070175 filed Aug. 27, 1979, now abandoned which in turn is a Continuation in Part of application Ser. No. 770,355 filed Feb. 22, 1977, now abandoned.

FIELD OF THE INVENTION

Hydrogen storage of regeneration.

BACKGROUND OF THE INVENTION

Hydrogen is a relatively cheap and clean fuel material which can be utilized in engines, fuel cells, and the like. Unfortunately, the storage of hydrogen in gaseous form presents many practical problems and such storage has, to all intents and purposes, been considered impractical for non-stationary uses because of the need for storing the hydrogen in heavy high-pressure cylinders.

Another approach which has received a great deal of attention is the use of reversible metal hydrides. It is well known that many metals form hydrides upon exposure to hydrogen under certain conditions of temperature and pressure and, upon combined conditions of lower pressure and higher temperature, are induced to dissociate into the metal and hydrogen itself. One of the best known and practical of these metals is magnesium which forms the hydride $MgH_2$. The starting material, magnesium, is cheap and provides a very high storage concentration of hydrogen per unit mass. Unfortunately, the mode of preparation of the hydride requires rather high pressures and temperatures and the uptake is rather slow. Furthermore, it is stable at ambient temperatures and rather high temperatures are required to dissociate the hydride to release the combined hydrogen. This stability has two disadvantages. First, outside forces of heat are necessary to generate "start up amounts" of hydrogen before the heating process can be self-sustained; and secondly, there is a substantial wastage involved in keeping the hydride at a temperature high enough to generate the desired quantities of hydrogen. Other hydrides have also been investigated. These include the mixed hydrides of lanthanum and nickel, of iron and titanium, and vanadium. Certain alloys of cerium known as mischmetal pentanickel have also been investigated. Unfortunately, most of these hydrides have a comparatively low storage capacity and low decomposition temperatures. It would be desirable therefore to provide a hydrogen storage material with the stability and storage capacity of magnesium hydride while still being able to provide sufficient hydrogen at relatively low temperatures for start up purposes.

SUMMARY OF THE INVENTION

There is provided a class of hydrogen storage materials comprising magnesium and other metals or alloys capable of forming hydrides. The second group of hydride forming materials possess one common characteristic and the preferred members, a second one also. They all have a substantially higher dissociation pressure at given temperatures than magnesium hydride; that is to say, they have a lower thermal stability than magnesium hydride and, certain of them, at the same time, will deliver at least one bar of hydrogen pressure at 20° C.

It is the surprising and totally unexpected finding of the present invention that, when members of the two components, namely magnesium and other metals or metal alloys within the aforementioned common category are mixed together in intimate contact as opposed to in alloyed form, not only are the desired criteria of storage fulfilled, but the total amount of storage far exceeds that of the individual components at a given temperature. Thus the compositions of the present invention are hydrogenated under pre-determined conditions of temperature and pressure, permitted to cool, and are storable in a sealed container whose pressure resisting capacities need not be substantial since, hydrogen will only be delivered in substantial amounts on the application of heat.

In the preferred embodiments, however, at ambient temperature, the composition will deliver just enough hydrogen to overcome atmospheric pressure; that is to say, the partial pressure of the mixture at about 20° C. will be of the order of one bar, that being sufficient to ignite a burner which in turn will initiate more rapid decomposition of the composition to provide enough hydrogen for the desired purposes, that is to say, running a fuel cell, an engine or the like. The great advantage of this arrangement lies in its extreme simplicity and the avoidance of either subsidiary initiating heat sources or high pressure storage devices.

Particularly desirable as metals or alloys of addition can be contemplated such as titanium, iron-titanium, vanadium, lanthanum/nickel and cerium based alloys such as mischmetal pentanickel.

The invention also concerns installations, particularly engines, for using the hydrogen stored in complex hydrides of the above-mentioned type. In particular, it includes an arrangement according to which, in order to supply for example an engine (or other energy receiving or transforming means) with hydrogen being released from complex hydrides having a low thermal stability, i.e., a low equilibrium temperature—such as those mentioned above with lanthanum-nickel or vanadium—the hydrogen being supplied from a tight hydride storing means discharges into a tank supplying the engine, in combination with means taking calories from said engine for heating, after start-up, the complex hydride to a temperature suitable for the magnesium hydride $MgH_2$ to release its hydrogen.

With such an arrangement engines can be started up from cold, i.e., without any previous heating.

The invention comprises, apart from the above arrangements, certain others which are preferably used at the same time and which will be explained in more detail hereafter.

It relates more particularly to certain applications (particularly for supplying engines, fuel cells etc.), as well as certain embodiments, of said arrangements; and it relates even more particularly, as novel industrial products, to the hydrides obtained with the processes of the kind in question and comprising the application of these same arrangements, as well as the installations for carrying on said processes and devices for using the hydrogen stored in the hydrides in question.

BRIEF DESCRIPTION OF THE DRAWINGS

The invention may be better understood from the following description of the accompanying drawings which are given solely for purposes of exemplification.

FIG. 2 is a diagram illustrating the absorption of hydrogen by a mixture of magnesium with lanthanum pentanickel compared with magnesium alone at a pressure of about 60 bars.

FIG. 3 is a similar diagram for a lower pressure of about 30 bars.

DESCRIPTION OF THE PREFERRED EMBODIMENTS

Figure 1:
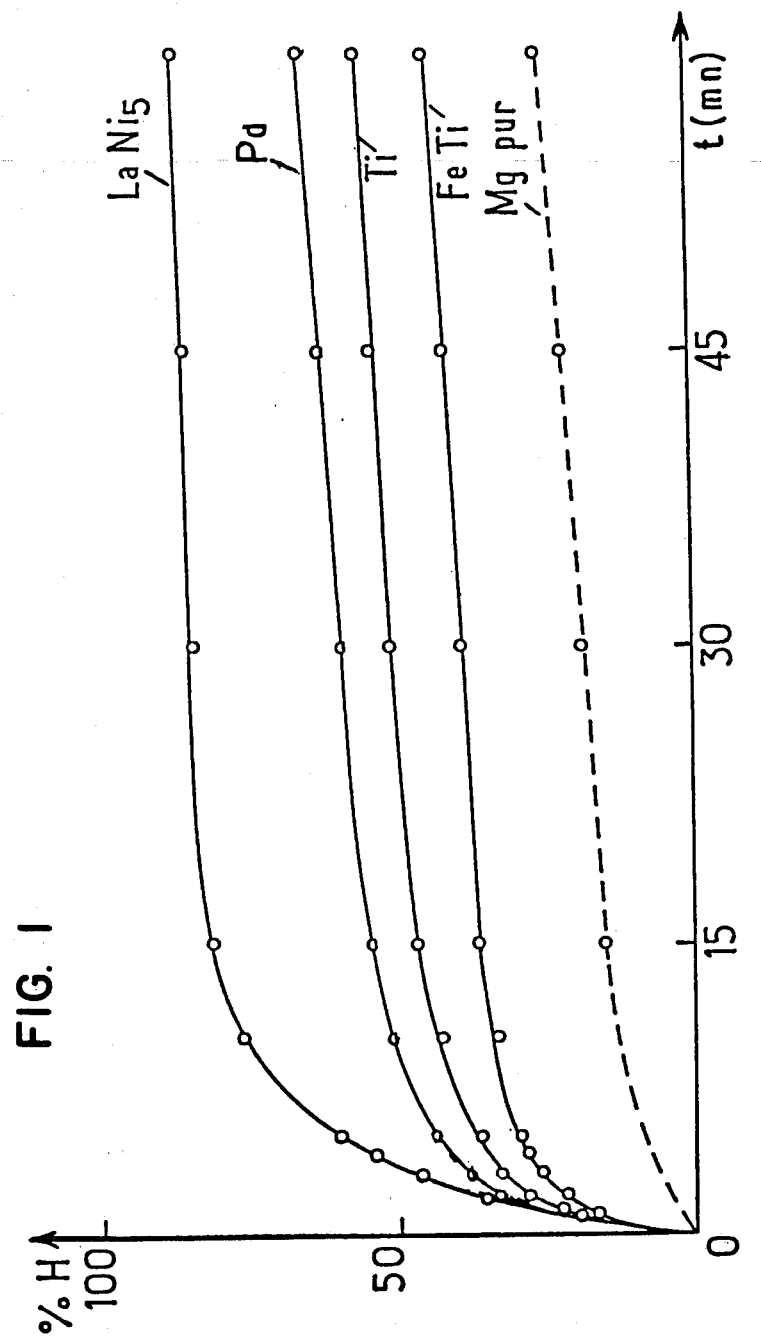
FIG. 1 is a diagram illustrating the absorption of hydrogen at 30 bars of pressure and 345° C. for pure magnesium (dotted line) and intimate mixtures of magnesium with iron titanium, titanium, palladium, and lanthanum pentanickel.
Figure 4:
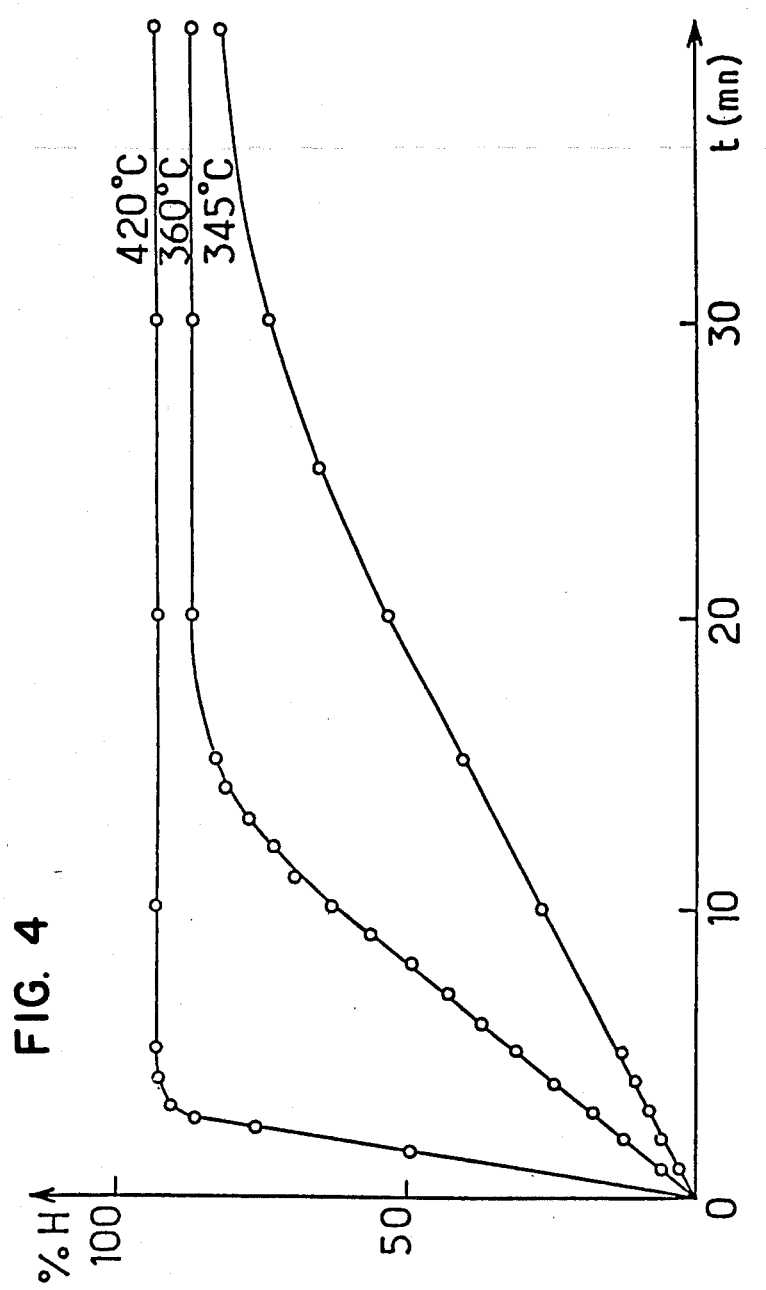
FIG. 4 is a similar diagram for the decomposition of the magnesium and lanthanum nickel hydride mixtures under two bars of pressure at different temperatures.

The present invention comprises the provision of certain novel hydrogen absorbing compositions. These compositions comprise at least two components. The first component is magnesium. The at least second component comprises a metal or metal alloy capable of forming hydrides. The hydrides of said at least second component shall have a lesser thermal stability than magnesium hydride. The preferred hydrides have a dissociation pressure of at least one bar at 20° C. The utilization of more than one metal or metal alloy as the second component is within the purview of the present invention.

The components are provided initially in finely divided or powdered form. The particle size is not critical, any readily available mesh size may be employed, the only provision being that the powder be fine enough to provide intimate mixing between the two or more components. It has been found desirable to utilize these powders in pellet form; thus the powders may be compressed together into pellets under pressure. The amount of pressure is in no way critical, but pressures of the order of 5 tonnes/sqcm have been found suitable. If desired, instead of using pelletized powders, thin sheets of the metals in question may be placed in intimate contact or thin filaments of metals may be woven together into strings, cords or the like. While the form of achieving contact is not critical and while, during the hydrogenation steps (which will be discussed in more detail hereinbelow) a certain amount of heat is applied, the temperature provided to the composition shall not exceed the melting point of any of the metallic components and, moreover, shall be below the temperature required to convert any of the previously unalloyed components into alloys with magnesium. It has been found that, in the practice of the invention, it is not needful to exceed 350° C.; and even at 450° C., the components will remain in powdered form and will not become alloyed. In fact, a temperature of 210°-345° is preferred for hydrogenation.

While the compositions of the present inventions are in no way to be considered as limited thereto, the following metals and alloys have been found advantageous as constituents of the second component:

Lanthanum nickel (which forms $LaNi_5H_6$)
Iron titanium (which forms $FeTiH$ and $FeTiH_{1.6}$)
Titanium (which forms $TiH_2$)
Palladium (which forms $PdH_{0.3}$) and
Vanadium (which forms $VH_2$)

According to another embodiment, magnesium is used in mixture with an alloy capable of absorbing hydrogen, one at least of the metal elements of the mixture being formed by cerium or being in the form of mischmetal pentanickel.

Advantageously magnesium is mixed with a ceric metal based alloy including a predominent quantity of cerium.

As ceric based alloy of this kind, the most preferred metal is under the name mischmetal.

It is recalled that mischmetal is defined in the Rompps chemical dictionary of Dr. Otto Albrecht Neumuller, Frencklische Verlagshandlung Stuttgart, 1972, page 2184, as an alloy comprising, in percentages by weight, 50 to 60% cerium, 25 to 30% lanthanum, 15 to 17% neodymium and 4 to 6% praseodymium.

Because of its ready availability, the product sold by the firm Rhone-Poulenc, S. A., is employed; however, any alloy of the mischmetal type fitting in with the definition given above which, even if it differs a little therefrom, lends nevertheless to hydrides complying with the characteristics mentioned above, comes within the scope of the invention.

The mixture of mischmetal pentanickel with the magnesium allows hydride mixtures to be obtained with high hydrogen capacity per unit of mass forming reserves of hydrogen of great purity. By thermal decomposition of the hydrides, the hydrogen may then be readily recovered for the desired applications.

Considering the low cost of the intermetal compounds of $MNi_5$ type, the advantages resulting from the use of an alloy such as defined above can be readily imagined.

According to a preferred variation for implementing the process of the invention, the alloy of the mischmetal type employed is used in the form of an intermetal compound with nickel.

Such an intermetal compound corresponds to the formula:

$$MNi_x$$

in which M represents the alloy of the mischmetal type and x is a number from 1 to 5, preferably of the order of 5.

The preparation of the intermetal compound of the mischmetal with nickel is carried out in accordance with conventional techniques by melting the components of the alloy, used in the desired stoechiometric proportions, e.g., in an argon atmosphere in an arc furnace. The ratio of magnesium to second component may lie between 9:1 through 7:3 g corresponding then to alloys containing from 10 to 30% in weight of second component. However, since the magnesium component is far cheaper than the second component, hence between 10 and 20% by weight of the second component, suitably 20% by weight of the second component, have been found entirely suitable.

Set forth below in the table is a summary of information concerning intrinsic properties of the components of certain metals which may be utilized for the present invention but should in no way be considered as limiting. Column 1 shows the melting points of the metals which form the hydrides under discussion. Column 2 shows the temperature at which the various hydrides provide a dissociation pressure of 30 bars. Conversely, Column 3 shows the dissociation pressure at ambient temperature or 23° C. It will be noted that certain of these hydrides, namely titanium hydride, and palladium hydride (in addition to magnesium hydride) show a dissociation pressure of less than one bar at 20° C. Clearly such hydrides would not be suitable for those uses where a starting pressure is essential. However, they may still be employed for their superior total storage capacity qualities.

Under desorption conditions, i.e., 350° C./2 bars, all the second component hydrides may be considered fully dissociated ($MgH_2$ dissociation pressure is of 7 bars at 350° C. and is then the highest limit for the desorption pressure of the mixtures of the invention at 350° C. (with highly purified Mg, the hydrogen pressure is 5.82 bars at 345° C. and 6.53 at 350° C.). In order to obtain a satisfactory desorption rate, lower pressures will be rather used at this temperature (for example 2 bars in curve 4).

The preferred pressure range for hydrogenation of the mixtures is between 20 and 60 bars.

| Metal or Alloy Hydride | MP of Metal or Alloy (°C.) | Temp for dissoc. press. of 30 bars (°C.) | Dissoc. press. at 345° C. (bars) | Dissoc.* press. at 20°C. (bars) |
|---|---|---|---|---|
| $MgH_2$ | 651 | 423 | 5.9 | $6 \times 10^{-7}$ |
| $LaN_5H_6$ | 1325 | 123 | 967 | 2 |
| FeTiH | 1317 | 89 | 1460 | 3.4 (7.9) |
| $TiH_2$ | 1675 | 315 | 40 | 0.3 |
| $PdH_{20.3}$ | 1552 | 320 | 48 | $1.5 \times 10^{-2}$ |
| $MNi_5H_6$ | 1320 | 28 | 1820 | 24 |
| $VH_2$ | 1890 | 86 | 8600 | 1.5 |

*Values for 4:1 M g/metals or alloys are same
NA: not available

EXAMPLES

Example 1—Preparation of hydride mixtures from Mg and $LaNi_5$

A mixture of powdered Mg and $LaNi_5$ is prepared, in proportions per unit of mass of 80% Mg to 20% $LaNi_5$. This mixture is then pelletized under a pressure of about 5 t/cm$^2$.

The pellet (or the pellets) obtained are then degasified in a vacuum, after being previously placed for example in the enclosure intended for the hydrogen reaction, then the hydrogen is introduced under pressure and at a suitable temperature.

Thus, according to a first embodiment, a pressure P or 60 bars and a temperature T of 345° C. are adopted.

In FIG. 2 are shown the hydrogen $H_2$ absorption curves, as a function of time, for Mg alone and for the Mg-$LaNi_5$ mixture of the invention.

The curves $S_1$ and $S_2$ relate to the absorption of hydrogen by simple magnesium, respectively in pellet and powder form.

Curve C relates to the absorption of hydrogen by the Mg-$LaNi_5$ mixture used according to the invention.

The synergistic action of $LaNi_5$ will be noted which, although in a proportion of only 20%, results in a considerable increase of the speed and the limit of hydridation (curve C).

According to a second embodiment, comparative curves of which are shown in FIG. 3, a lower pressure P, approximately 30 bars, is used and the temperatures are varied from 210° C. to 345° C.

At this pressure P, it can be seen that powdered magnesium shows a fairly low absorption curve $S_2$, whereas nothing happens with the magnesium in pellet form (curve $S_1$).

On the other hand, the Mg+$LaNi_5$ mixture shows, here again, much better absorption curves $C_1, C_2, C_3, C_4$.

After hydridation at 345° C., 30 bars and cooling at 20° C. of a mixture of 800 g of Mg and 200 g of $LaNi_5$, Mg is 85% hydrided (51.7 g of hydrogen are obtained), $LaNi_5$ is 100% hydrided (2.74 g of hydrogen are obtained), that is to say, 54.44 g of hydrogen are obtained per kg of mixture.

Under the same conditions, with 800 g of Mg alone, about 25% are hydrided (curve $A_2$), 15.3 g of hydrogen being obtained, and with 200 g of $LaNi_5$ alone, at 20° C., (100% hydrided) 2.74 g of hydrogen are fixed.

Into practical energy terms 75 liters of gasoline correspond to 16.7 kg of hydrogen (45 l per 10 kg of hydrogen). Under the conditions of example 1, an engine would have to be supplied with 305 kg of Mg/(20%) $LaNi_5$ mixture (85% hydridation for Mg and 100% for $LaNi_5$) compared to 1,211 kg of $LaNi_5$ (100% hydridation) or 873 kg of Mg (25% hydridation).

It is to be noted that, during hydridation, the pellets substantially double in volume, but keep relatively good mechanical properties, so that they can be handled without crumbling.

Finally, complex hydrides or hydride mixtures thus formed (comprising $MgH_2$ and $LaNi_5H_{6-x}$, in which x represents zero or a positive number less than 6) and suitably conserved in tight containers permit the hydrogen to be supplied at ambient temperatures, at least at the start-up of the combustion operations to be provided, as will be outlined below, this property being due to the presence of $LaNi_5$ hydride whose equilibrium temperature at which hydrogen, as is known, begins to be released, is close to the ambient temperature.

Example 2—Preparation of hydride mixtures from Mg and V

A mixture is prepared, in proportions per unit of mass of 80% magnesium and 20% vanadium in powder form and the mixture is then pelletized as in Example 1.

The pellets thus obtained are placed in the reaction enclosure, degassified in a vacuum and then, as in Example 1 above, hydrogen is introduced.

Figure 5:
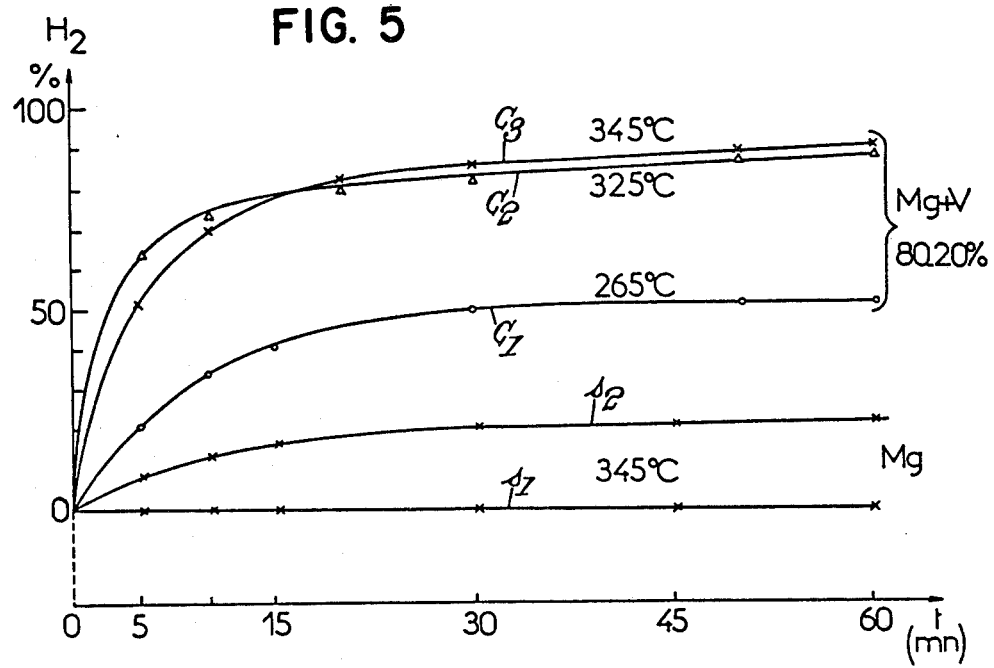
FIG. 5 is a diagram similar to FIG. 2 for a magnesium vanadium mixture.

FIG. 5 shows, like FIG. 3, the variation as a function of time of the hydrogen absorbed at a pressure P of 30 bars and at different temperatures between 265° C. and 345° C.

The results are not modified after numerous absorption-desorption cycles. They are close to those obtained for the above-mentioned mixture. After 80% hydridation of the magnesium present, the pellets substantially double in volume but conserve sufficient cohesion to allow their handling.

The aforementioned procedure provides for 80% hydridation of the magnesium and 100% hydridation of the vanadium giving a total hydrogen capacity (measured at 20° C.) of 48.7 g/kg of mixture. 56.2 g of hydrogen are then obtained with 1 kg of said mixture. Under the same conditions, 15.3 g of hydrogen are obtained with 800 g of Mg (25% hydration) alone and 7.5 g of hydrogen are obtained with 200 g of V (100% hydridation) alone.

EXAMPLE 3—Preparation of mischmetal pentanickel powder

A metal block of mischmetal (sold by Rhone-Poulenc, S. A.) was reduced to fine flakes by grating. It was then mixed with nickel in the stoechiometric proportions corresponding to the $MNi_5$ formula and the mixture was pelletized.

The alloy was then melted in an argon atmosphere in an arc furnace. The melting time was a few seconds. By means of a hydridation cycle, the product thus obtained was reduced to powder condition, which facilitates its handling when mixing with the magnesium in the desired proportions.

A powdery mixture of Mg and $MNi_5$ was prepared in proportions per unit of mass of 80% Mg and 20% $MNi_5$. This mixture was then pelletized at a pressure of the order of 5 t/cm$^2$.

Example 4—Hydridation of magnesium/mischmetal pentanickel pellets

The pellets obtained in accordance with Example 3 above were placed in a reaction enclosure and then degassified in a vacuum.

The hydridation reaction was then initiated by introducing into the enclosure, at a temperature of 345° C., hydrogen at a pressure of 30 bars.

A hydride mixture was obtained comprising $MgH_2$ and $MNi_5H_{6-z}$, z designating a positive number less than 6 or equal to zero.

Figure 6:
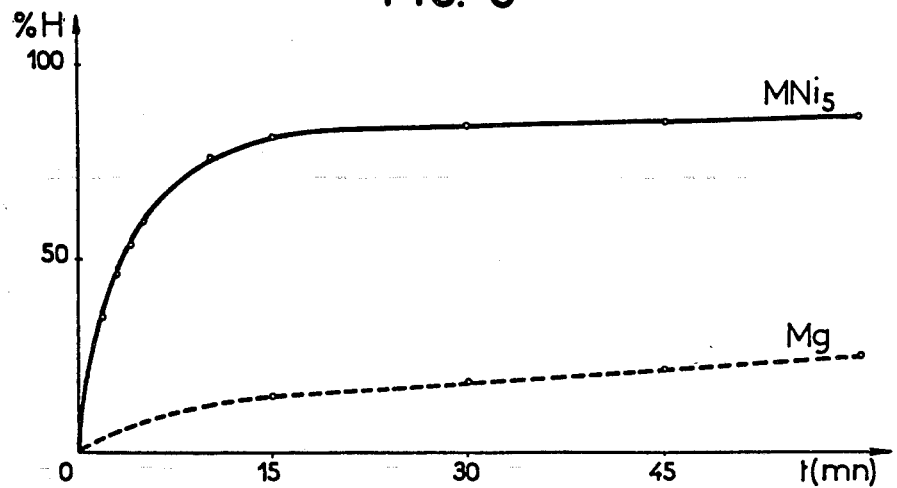
FIG. 6 is a similar diagram for magnesium/mischmetal pentanickel.

In FIG. 6, there is shown the hydrogen absorption curves, with respect to time, of the $Mg-MNi_5$ mixture, and the one obtained with Mg alone. A comparison of these two curves shows a considerable increase in the speed and the limit of hydrogen absorption with the hydride mixture of the invention.

The procedure provides 87% hydridation of Mg (52.9 g of hydrogen with 800 g of Mg) and 100% hydridation of $MNi_5$ (2.6 g of hydrogen with 200 g of $MNi_5$) giving a hydrogen capacity (measured at 20° C.) of 55.5 g per kg of mixture (compared to 15.3 g for 800 g of Mg alone) (25% hydridation) plus 2.6 g for 200 g of $MNi_5$ alone (100% hydridation).

It is to be noted that the experimental values given in the specification correspond to hydridation periods of 1 hour (see curves 1 to 6). The values would be higher with longer periods of time.

In accordance with the above procedure, but using FeTiH or FeTiH$_{1.6}$, in place of mischmetal pentanickel, similar results are obtained.

Where, similarly PdH$_{0.3}$ or TiH$_2$ are used, a synergistic enhancement of hydrogen storage capacity is also provided.

Figure 7:
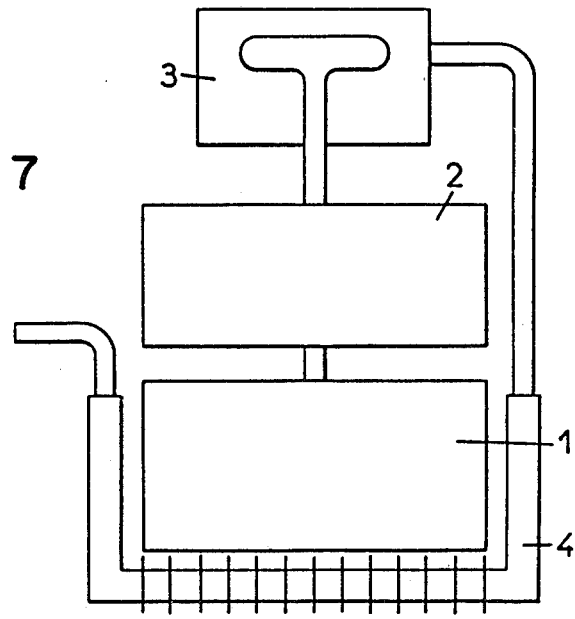
FIG. 7 is a highly schematic indication of the use of the composition of the present invention in an engine.

Example 5—Application of the hydride mixture in accordance with Example 1 or 4 for supplying hydrogen to hydrogen-consuming engines The application is carried out in the apparatus schematically illustrated in FIG. 7. The hydride mixture or complex hydride formed for example by $MgH_2$ and $LaNi_5H_6$ or $MgH_2$ and $MNi_5H_{6-z}$ is contained in a first gas tight tank 1 which communicates with an expansion tank 2 which supplies the engine 3 with hydrogen.

The pressure in tank 2 is, for example, about 2.5 bars, and the hydrogen flow supplied from the amount of $LaNi_5H_6$ contained in the mixture is sufficient for starting up the engine.

Heating of the mass stored in tank 1, as shown for example in FIG. 7, is accomplished with calories drawn from the exhaust system 4 of the engine to provide for the decomposition of $MgH_2$ which then provides for operation of the engine. In the operating mode (T being equal to about 350° C.) $LaNi_5H_6$ or $MNi_5H_{6-z}$ completely decompose to $LaNi_5$ or $MNi_5$, the equilibrium pressure in tank 2 is that corresponding to system $MgH_2$-$Mg+H_2$ at the temperature desired (7 bars at 350° C.).

When the engine is stopped, thus allowing tank 1 to cool, the pressure and volume of hydrogen available in tank 2 will be sufficient for reforming $LaNi_5H_6$ or $MNi_5H_{6-z}$ which will allow the next start up to be made.

The hydride mixtures as above disclosed can also be used for supplying electrochemical devices, particularly electrochemical cells or fuel cells.

The process described in the above application may be used here again. The heating of tank 1 will be accomplished by Joule effect by using a part of the energy of the cell.

In accordance with the above procedure, but where in place of $LaNi_5H_6$ or $MNi_5H_{6-z}$ there is used FeTiH FeTiH$_{1.6}$ VH$_2$, TiH$_2$ or PdH$_{0.3}$ similar results are obtained, except that in the last two uses external heat sources for startup are advisable.

Whereby, whatever embodiment is adopted, the invention provides improvement in $MgH_2$ formation conditions and provides the possibility of storing hydrogen in hydride masses, especially those based on $MgH_2$, with hydrogen pressures and temperatures lower than those necessary up to now, and with a higher hydrogen power per unit of mass. Moreover, the hydrogen can be supplied at low temperatures owing to the presence of hydrides of addition, which avoids the necessity of having heating apparatus for starting.

As it will be understood, and as it results furthermore from what has been said above, the invention is in no wise limited to those of its modes of application and embodiments more especially considered; it covers, on the contrary, all variations.

We claim:

1. A process of storing hydrogen in a mixture of hydrides containing magnesium hydride comprising the steps of:

a. mixing magnesium and at least one other metal or alloy or other metals capable of absorbing hydrogen under the conditions of steps d and e, said other metal or alloy being capable of forming hydrides of thermal stability less than that of magnesium hydride, and having a dissociation pressure of at least 1 bar at 20° C., the amount of said other metal or alloy being sufficient to increase the hydrogen absorptive capacity of the total mixture over that of the sum of its parts under the conditions of steps d and e, the components of said mixture having previously been powdered or pulverized;

b. pelletizing thus produced powder;

c. vacuum degasifying the thus produced pellets;

d. placing the pellets in an enclosed empty vessel; and e. providing hydrogen to said vessel at a predetermined temperature below 350° C. and the melting point of said pelletized mixture and pressure of 20–60 bars to permit absorption of the hydrogen upon the pellets.

2. The process in accordance with claim 1 wherein the said other metals or alloys selected from the group consisting of lanthanum/nickel, vanadium, mischmetal/nickel, or iron/titanium.

3. A process in accordance with claim 1 where the hydrogen is provided at a temperature of about 210° to about 350° C.

* * * * *